United States Patent
Biskeborn

(10) Patent No.: US 8,934,189 B2
(45) Date of Patent: Jan. 13, 2015

(54) MAGNETIC WRITE HEAD HAVING ELECTRICALLY BIASABLE STRUCTURES

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/889,016

(22) Filed: May 7, 2013

(65) Prior Publication Data

US 2014/0334037 A1 Nov. 13, 2014

(51) Int. Cl.
*G11B 5/03* (2006.01)
*G11B 5/187* (2006.01)

(52) U.S. Cl.
CPC .................................... *G11B 5/187* (2013.01)
USPC .......................................................... 360/66

(58) Field of Classification Search
USPC ................... 360/66, 323, 123.1, 125.1, 125.2, 360/125.3, 125.4
See application file for complete search history.

(56) References Cited

U.S. PATENT DOCUMENTS 4,685,013 A * 8/1987 Joannou et al. .......... 360/123.57
4,987,501 A * 1/1991 Hori ................................ 360/64
2001/0033467 A1 * 10/2001 Engel et al. .................... 360/325
2006/0018070 A1 * 1/2006 Iben ............................. 361/91.1
2007/0133131 A1 * 6/2007 Biskeborn ..................... 360/323
2007/0247749 A1 10/2007 Bonhote et al.
2008/0002291 A1 1/2008 Balamane et al.
2008/0221981 A1 * 9/2008 Biskeborn ....................... 705/14
2009/0180216 A1 * 7/2009 Golcher et al. ............... 360/323
2010/0073826 A1 3/2010 Araki et al.
2011/0038081 A1 2/2011 Contreras et al.
2011/0109993 A1 5/2011 Contreras et al.
2012/0212854 A1 8/2012 Golcher et al.

FOREIGN PATENT DOCUMENTS

EP 0 742 557 B1 5/2001

OTHER PUBLICATIONS

Lamberton et al., "Current-in-Plane GMR Trilayer Head Design for Hard-Disk Drives: Characterization and Extendibility," 2007 IEEE, IEEE Transactions on Magnetics, vol. 43, No. 2, Feb. 2007, pp. 645-650.

* cited by examiner

*Primary Examiner* — Tan X Dinh
(74) *Attorney, Agent, or Firm* — Zilka-Kotab, PC

(57) ABSTRACT

An apparatus according to one embodiment includes a resistive link coupled to both an electrically conductive bus and an electrically conductive structure, the electrically conductive structure being positioned proximate to a media bearing surface. An apparatus according to another embodiment includes an array of transducers; an electrically conductive bus; and resistive links electrically coupled between the electrically conductive bus and at least one of: each of a plurality of electrically conductive structures, and at least some of the transducers.

16 Claims, 9 Drawing Sheets

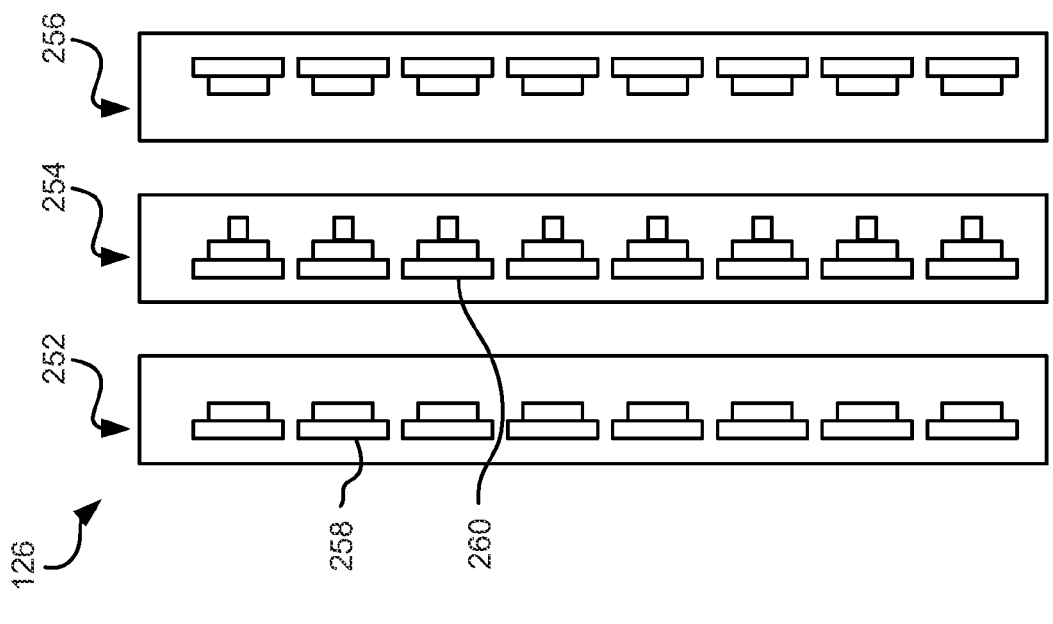
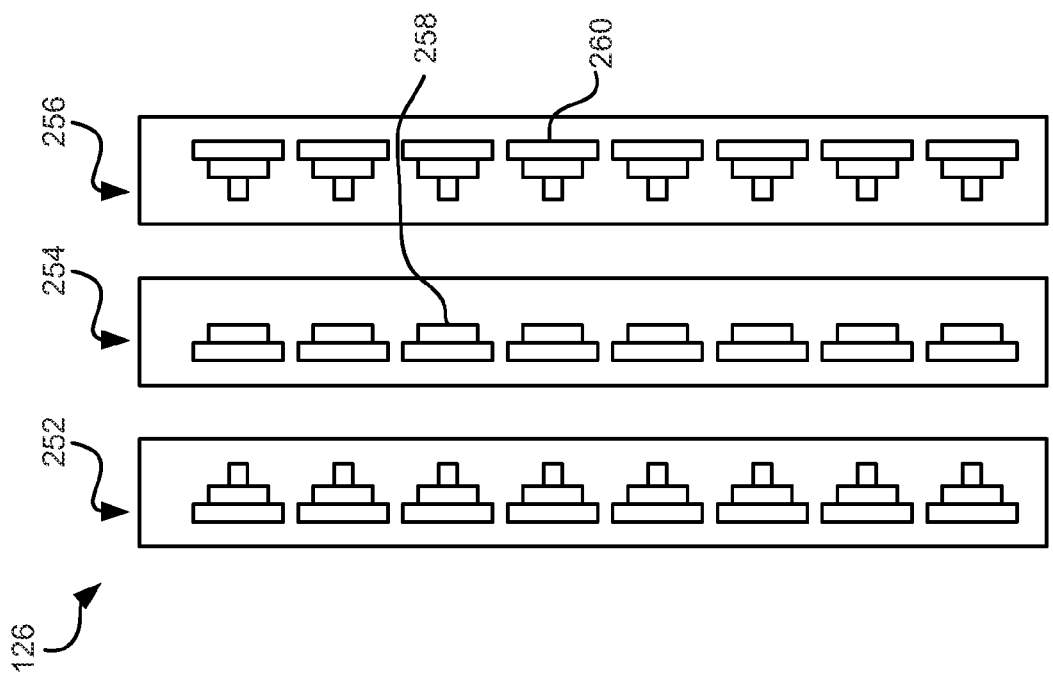

MAGNETIC WRITE HEAD HAVING ELECTRICALLY BIASABLE STRUCTURES

BACKGROUND

The present invention relates to data storage systems, and more particularly, this invention relates to magnetic heads having electrically biasable structures.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

However, conventional magnetic head products suffer from degradation of writing quality, resulting from adverse effects caused by electrical charge buildup created during extended periods of use. For example, such adverse effects may include an increase in the separation between a magnetic recording head and a recording medium as result of wear, debris accumulation, electrical deplating, oxidation, etc., and combinations thereof. Moreover, degraded writing, if severe enough, can lead to loss of capacity, lower performance, lower throughput and/or interchange problems for removable media.

BRIEF SUMMARY

An apparatus according to one embodiment includes a resistive link coupled to both an electrically conductive bus and an electrically conductive structure, the electrically conductive structure being positioned proximate to a media bearing surface.

An apparatus according to another embodiment includes an array of transducers, an electrically conductive bus; and resistive links electrically coupled between the electrically conductive bus and at least one of: each of a plurality of electrically conductive structures, and at least some of the transducers.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems which address degradation of writing quality in magnetic recording heads during operation, as well as operation and/or component parts thereof.

As described above, conventional magnetic head products suffer from degradation of writing quality, resulting from electrical charge buildup formed during extended periods of use.

In sharp contrast, various embodiments described and/or suggested herein electrically bias electrically conductive structures of magnetic heads, which may include write poles, shields, wear structures, etc. to a desired voltage to mitigate adverse tribological effects. As a result of the biasing, the effects of de-plating, electrostatic and other mechanism deposition phenomena to be significantly reduced.

In one general embodiment, an apparatus includes a resistive link coupled to both an electrically conductive bus and an electrically conductive structure, the electrically conductive structure being positioned proximate to a media bearing surface.

In another general embodiment, an apparatus includes an array of transducers; an electrically conductive bus; and resistive links electrically coupled between the electrically conductive bus and at least one of: each of a plurality of electrically conductive structures, and at least some of the transducers.

Figure 1A:
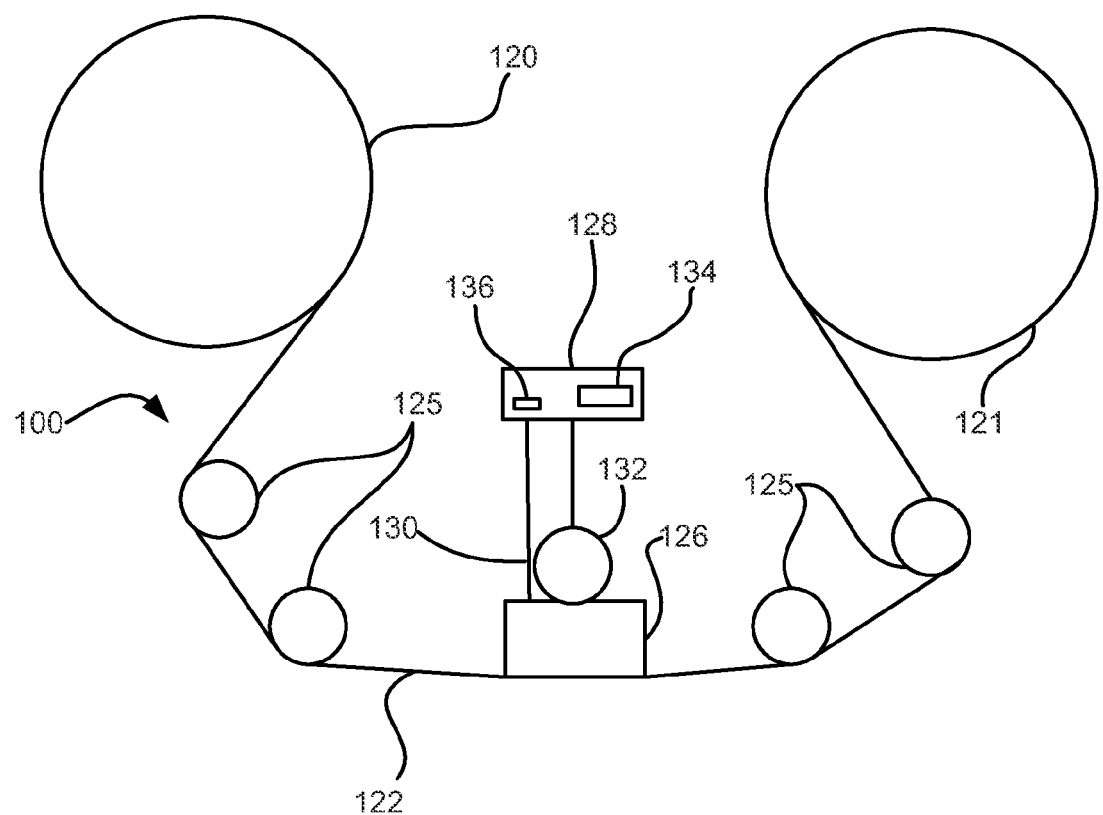
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
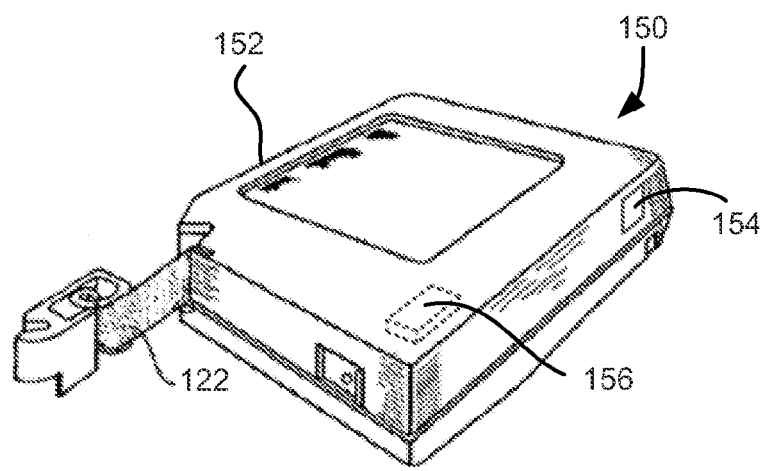
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
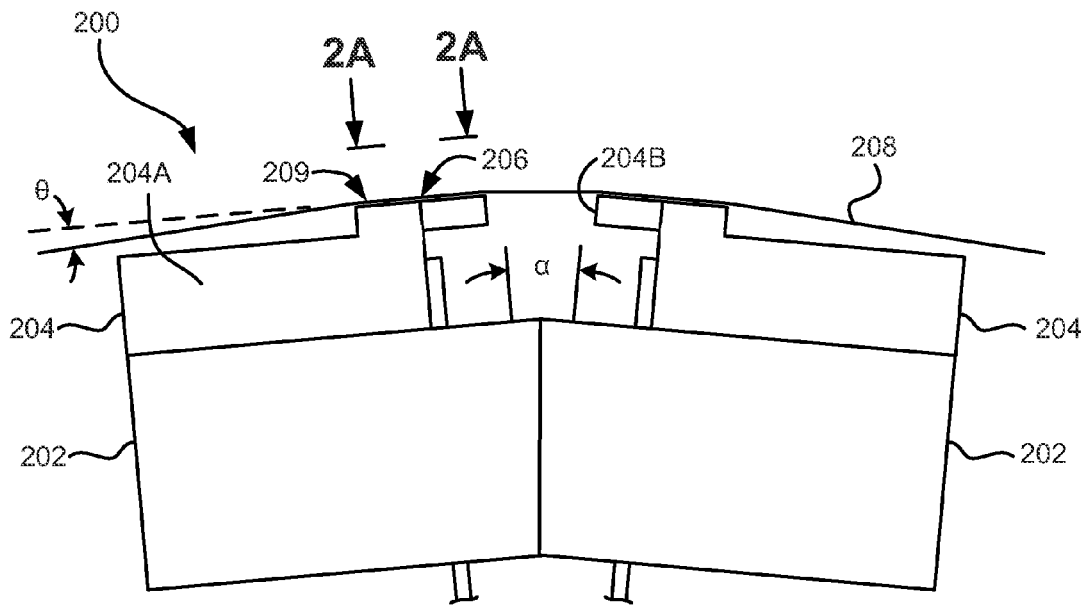
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
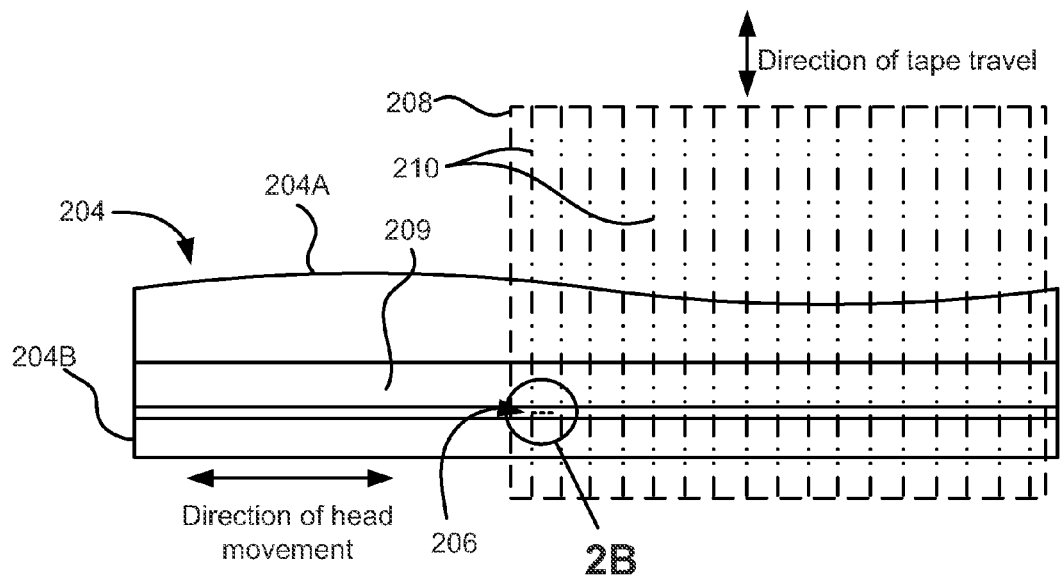
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
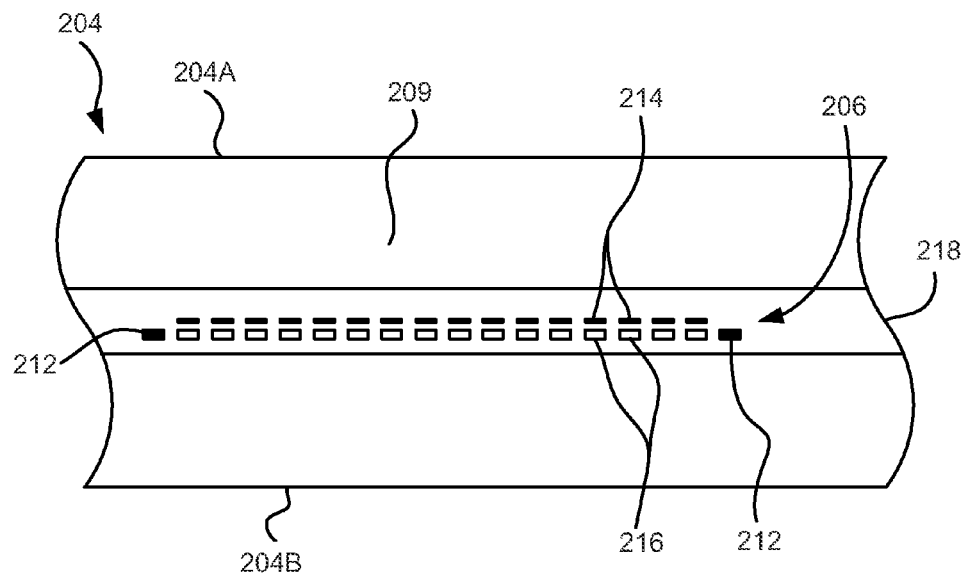
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
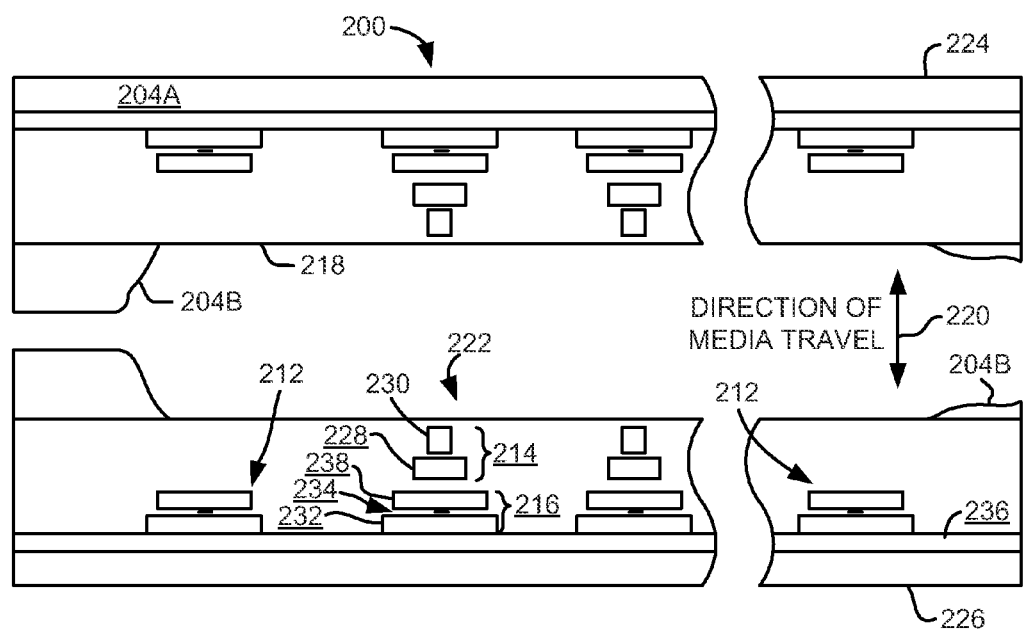
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
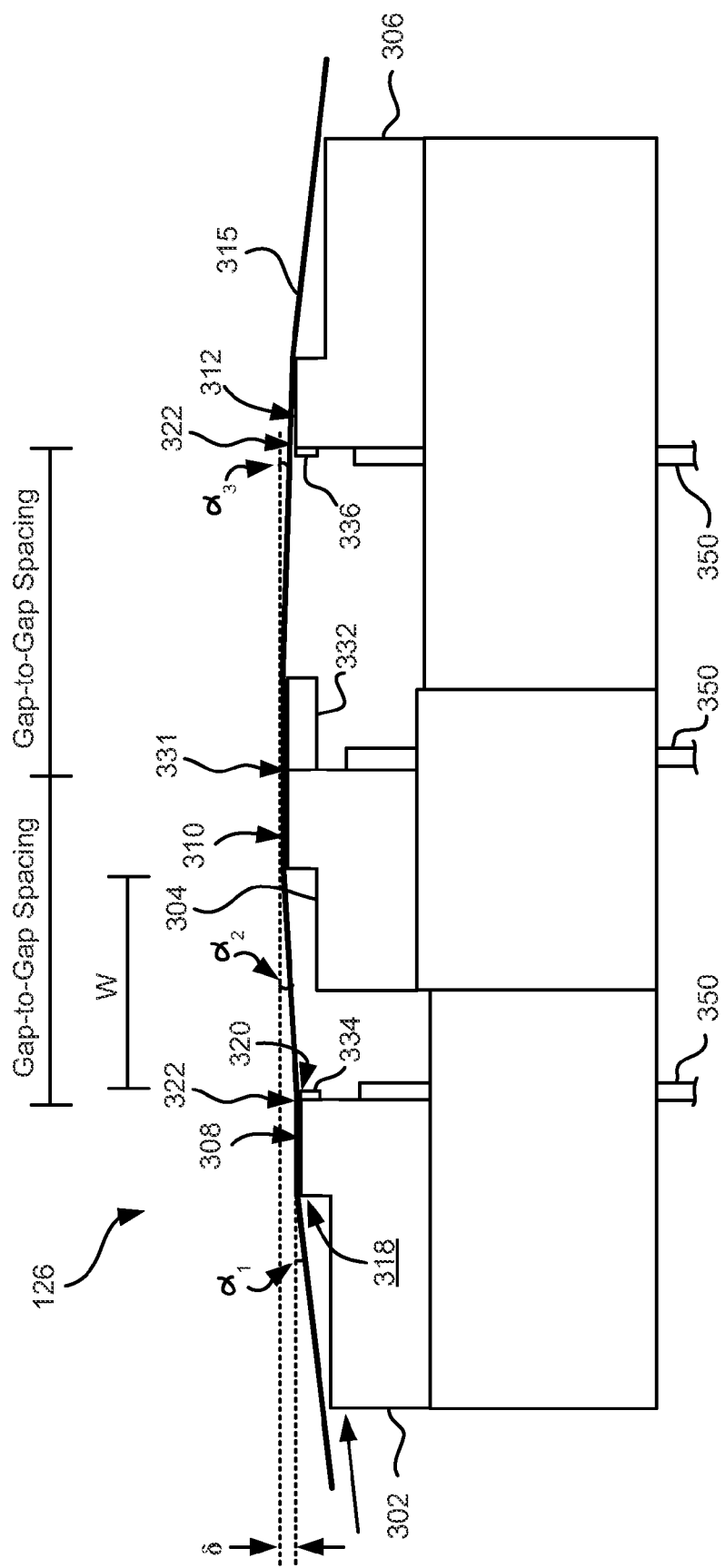
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
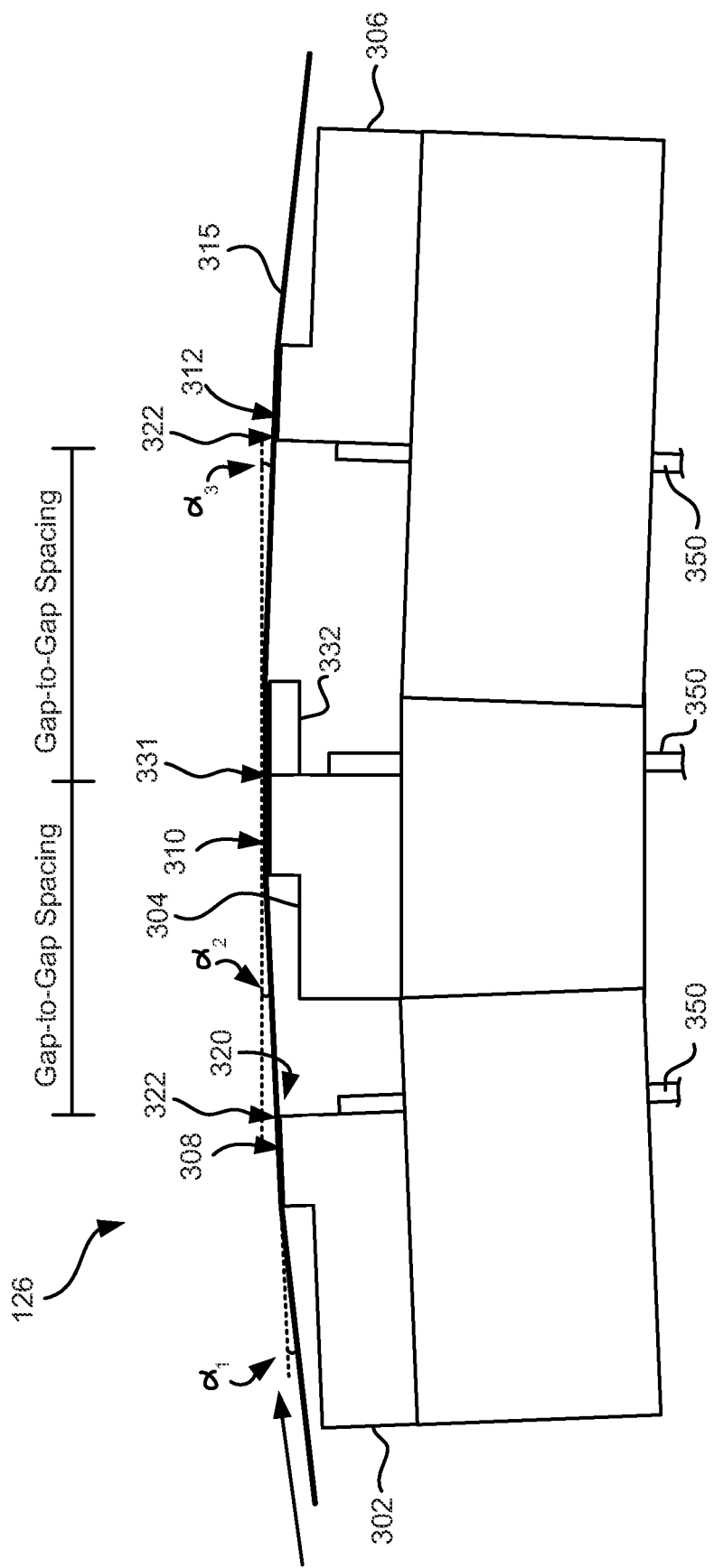
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
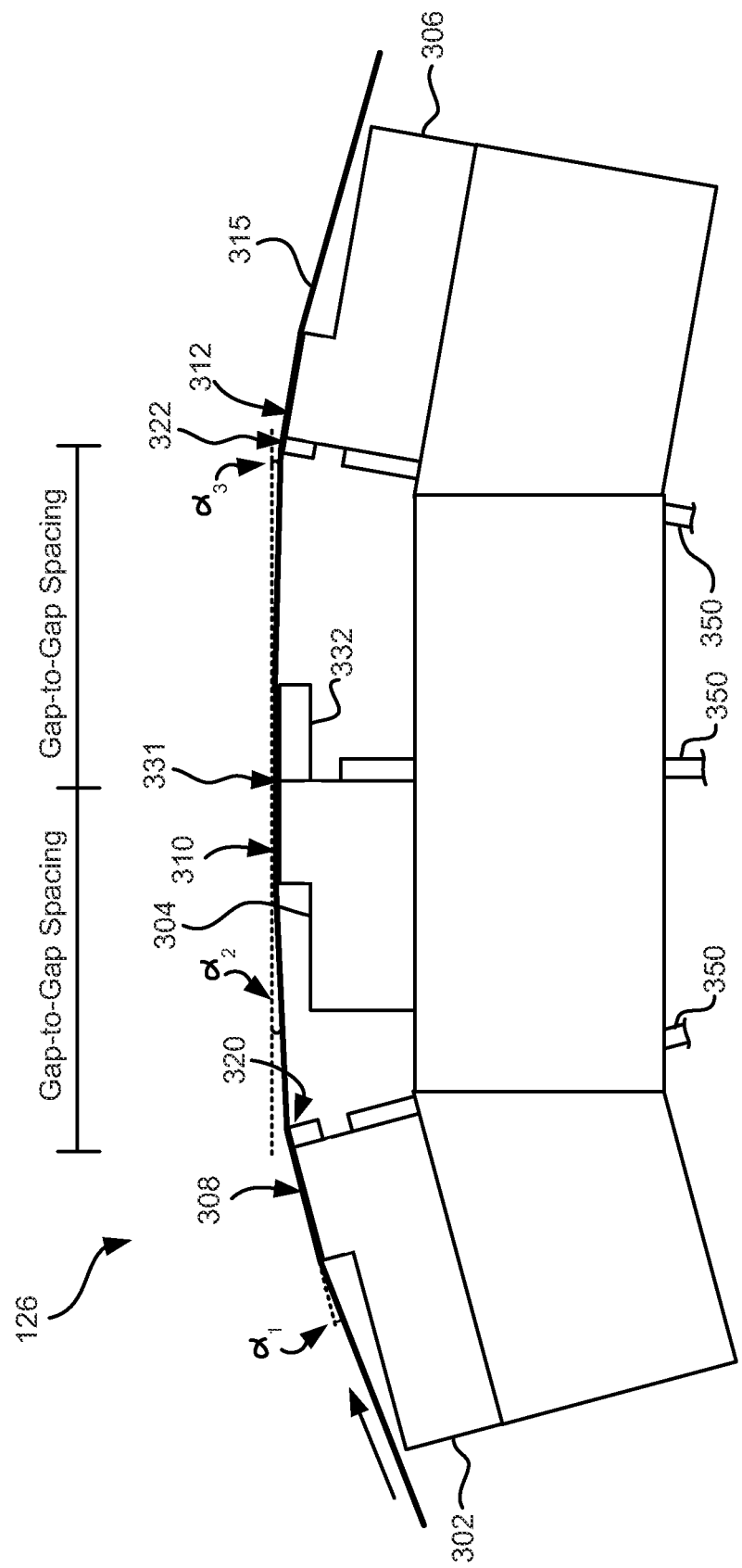
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

Magnetic heads, such as those listed above, may have electrically biased portions depending on the desired embodiment, and thereby may be used in combination with any of the approaches described below. As previously mentioned, various embodiments described and/or suggested herein may electrically bias components (e.g., the electrically conductive structures) of magnetic heads to a desired voltage. As a result, this biasing causes overall improvement to magnetic head operations and reliability.

Figure 8:
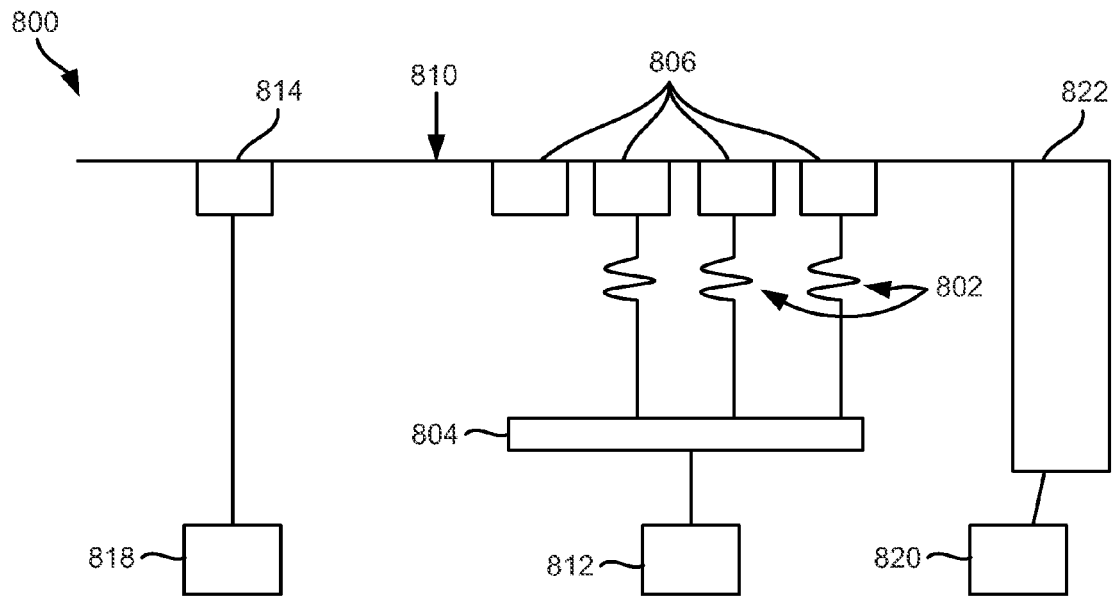
FIG. 8 is a representational diagram according to one embodiment.

FIG. 8 depicts a representative diagram of an apparatus 800, in accordance with one embodiment. As an option, the present apparatus 800 may be implemented in conjunction with features from any other embodiment listed herein, such as those described with reference to the other FIGS. Of course, however, such apparatus 800 and others presented herein may be used in various applications and/or in permutations which may or may not be specifically described in the illustrative embodiments listed herein. Further, the apparatus 800 presented herein may be used in any desired environment.

Referring now to FIG. 8, the apparatus 800 includes a plurality of resistive links 802 coupled to both a first electrically conductive bus 804 and electrically conductive structures 806. The apparatus 800 also includes a first connection pad 812 coupled to the first electrically conductive bus 804.

In some approaches, as also shown in FIG. 8, a sensing structure 814 is coupled to a second connection pad 818. It should be noted that the sensing structure 814 is preferably an electrically conductive structure, but is not limited thereto.

Furthermore, the apparatus 800 may include a magnetic head, e.g., according to any of the approaches described and/or suggested herein. In some embodiments, the magnetic head may be a magnetic tape or disk head, but is not limited thereto. Thus, in no way wishing to limit the invention, a magnetic head may include at least one resistive link, conductive bus and electrically conductive structure therein, according to any of the approaches described herein.

As illustrated in FIG. 8, each of the electrically conductive structures 806 may be coupled to the electrically conductive bus 804 by a unique one of the resistive links 802. However, it should be noted that while a single resistive link 802 is shown representing each connection, each resistive link 802 may include more than one resistive path between the electrically conductive bus 804 and each of the electrically conductive structures 806.

Moreover, each of the resistive links 802 may have a different resistance value which may result in a different biasing potential applied to the respective electrically conductive structures 806, as will be discussed in further detail below.

According to various approaches, the resistive links 802 may have a resistive value between about 0.1 k$\Omega$ and about 500 M$\Omega$, more preferably between about 1 k$\Omega$ and about 1 M$\Omega$, but could be higher or lower depending on the desired embodiment. Moreover, the resistive links 802 may include, but are not limited to, tantalum, ruthenium, iridium, etc. Furthermore, each of the first and/or second electrically conductive buses 804, 816 may include, copper, tantalum, aluminum, gold, etc.

In other approaches, one or more of the electrically conductive structures 806 may not be coupled to the electrically conductive bus 804 at all, as shown in the apparatus 800. Moreover, according to another approach, one or more of the electrically conductive structures 806 may be electrically connected to each other. Thus, two or more of the electrically conductive structures 806 may share a common resistive link 802.

Furthermore, the electrically conductive structures 806 may be coupled to more than one electrically conductive bus. For example, which is in no way intended to limit the invention, at least some of the electrically conductive structures 806 may be coupled to the first electrically conductive bus 804, while one or more of the electrically conductive structures 806 may be coupled to another electrically conductive bus (not shown), which may be the same, similar or different than the first and/or second electrically conductive bus 804, 816. In one approach, each type of electrically conductive structure, e.g., writer pole, reader shield and/or non-transducer-related structure, as discussed in further detail below, may be coupled to a respective electrically conductive bus. However, although not shown, in another approach, an apparatus may not include a bus between an electrically conductive structure and a pad if there is only one resistive link and a single electrically conductive structure coupled thereto.

In different approaches, the electrically conductive structures 806 may include at least one of a writer pole and/or reader shield, which may include any of the designs described and/or suggested herein, as well as any type known in the art. According to other approaches, some of the electrically conductive structures 806 may include non-transducer-related structures, e.g., which have no function in the device relating to data transduction (reading and/or writing), including servo data. In another approach, one or more of the electrically conductive structures 806 may include an antenna which may be used to discharge any electric potential which may be acquired when shorting between the components of the apparatus occurs. The electrically conductive structures 806 may also serve as a discharge point for tribocharging.

Furthermore, the electrically conductive structures 806 are preferably at least partially conductive, but may also have resistive characteristics. Thus, according to different approaches, the electrically conductive structures 806 may be nonmagnetic or magnetic, and may include ferrite, nickel-iron, cobalt-iron, tantalum, iridium, etc. or combinations (e.g., laminations) thereof, depending on the embodiment. However, according to some approaches, the electrically conductive structure may be more resistant to wear from media abrasion than most other materials in the apparatus and may include material resistant to abrasion. Such electrically conductive structure may be deemed to be a wear structure. Examples are Sendust and CZT.

Note that the wafer substrate 822 of the transducers and closure (if present), while typically conductive (e.g., of AlTiC), are not to be considered electrically conductive structures 806 in at least a tape head implementation. Rather, the electrically conductive structures 806 in a tape head are thin film structures. Further, the substrate of the tape head may be biased, e.g., to 0.1 to 5 volts, in any known manner, but could be higher or lower in other approaches. The closure, if present, may be electrically coupled to the substrate, e.g., by conductive paint, wire, etc. A pad 820 may be electrically coupled to the substrate 822.

As illustrated, in FIG. 8, one or more of the electrically conductive structures 806, including the sensing structure 814, are preferably positioned proximate to a media bearing surface 810. Referring to the present description, "proximate" is intended to mean very near the media bearing surface (MBS) 810, e.g., within about 100 nm therefrom. In various exemplary embodiments, the MBS is a tape bearing surface, or TBS. Thus, according to different approaches, one or more of the electrically conductive structures 806 may form part of the MBS 810, may protrude from the MBS 810 and/or may be slightly recessed therefrom, may have a protective overcoat thereover, etc.

Figure 9A:
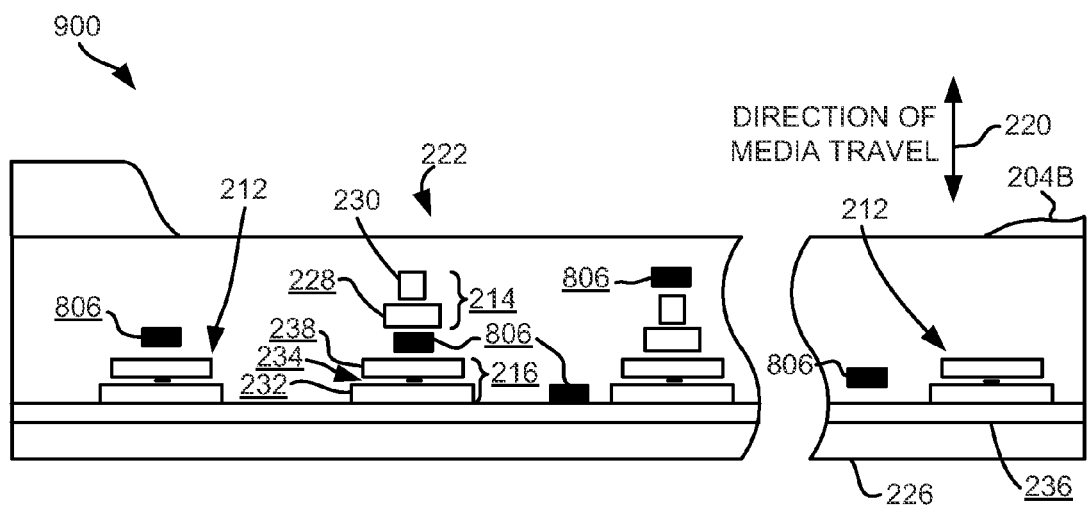
FIG. 9A is a detailed view of a partial tape bearing surface according to one embodiment.

According to an illustrative embodiment, FIG. 9A illustrates a variation of the embodiment of FIG. 2C depicting several exemplary positions where the electrically conductive structures 806 may be positioned within a magnetic head 900. Accordingly, various components of FIG. 9A have common numbering with those of FIG. 2C. The conductive structures 806 are shown positioned in various locations within the partial tape bearing surface view of FIG. 9A. As illustrated, the conductive structures 806 may be formed between, above and/or below writers 214, readers 216 and/or servo readers 212. According to another approach, the writers 214, readers 216 and/or servo readers 212 may be connected to an electrically conductive bus via resistive links.

Moreover, although the electrically conductive structures 806 of FIG. 9A are illustrated as discrete structures, in another exemplary embodiment, which is in no way intended to limit the invention, the electrically conductive structures 806 may be formed as a single structure which may span along the media bearing surface 810 of FIG. 8.

Figure 9B:
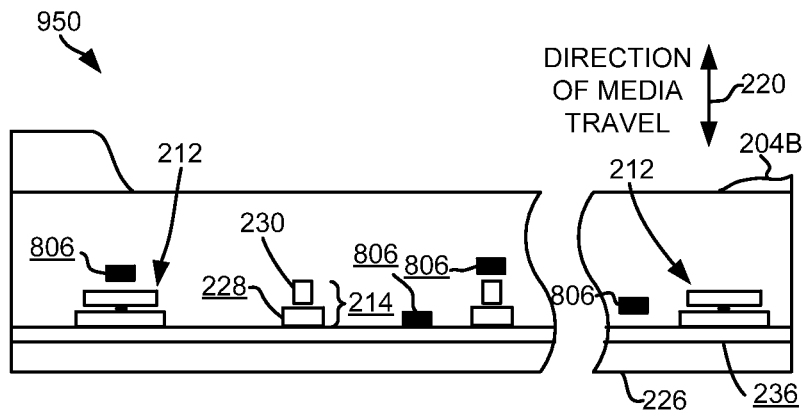
FIG. 9B is a detailed view of a partial tape bearing surface according to another embodiment.

FIG. 9B depicts an apparatus 950 that is a variation on the structure shown in FIG. 9A. In FIG. 9B, the array of transducers includes writers 214 flanked by servo readers 212. Electrically conductive structures 806 are also shown.

Referring back to FIG. 8, as mentioned above, the first electrically conductive bus 804 is shown as being coupled to the first connection pad 812, which may be connected to a ground, to a substrate connection pad 820, or to a biasing circuit. Thus, according to one approach, the electrically conductive bus 804 may be grounded, which may bias the electrically conductive structures 806 connected thereto if the ground is biased. However, in other approaches, a circuit coupled to the first connection pad 812, e.g., via a cable, may be capable of biasing the bus 804 to a selected voltage, which in turn will bias the electrically conductive structures 806 as well. According to one approach, the connection pad 812 may connect one or more of the electrically conductive structures 806 to internal and/or external electronic circuitry. Thus one or more of the electrically conductive structures 806 may be biased to a predetermined potential (e.g., fixed or variable), which may be higher than ground, ground, or lower than ground. According to various approaches, the predetermined potential may be determined by user input, computing, logic, retrieved from a lookup table, derived from the head operating conditions, etc.

According to one approach, the apparatus may include biasing circuitry (e.g., see 1002 of FIG. 10) which may be used to bias the electrically conductive structures 806 to a voltage that changes with time, data readings from the sensing structure, user input, triobological conditions of the apparatus 800, etc., as will be discussed in further detail below.

Furthermore, as described above, the resistive links 802 may have different resistive values. For example, the bus 804 may be biased to a given voltage, but depending on the resistive values of the resistive links 802, each of the electrically conductive structures 806 may be biased to a slightly different voltage, depending on the tribological current that flows through the electrically conductive structures 806. In some approaches, the resistive links 802 may incorporate variable resistance which may be controlled by a user, a controller, logic, etc., to tune the biasing voltage of the electrically conductive structures 806.

By biasing the electrically conductive structures 806 to a desired voltage, the voltage of the electrically conductive structures 806 is effectively fixed. Thus, the electrically conductive structures 806 do not allow electrical charge buildup thereon during extended periods of use. Moreover, by biasing the structures to a desired voltage, the adverse effects of de-plating, electrostatic or other mechanism deposition phenomena may be significantly reduced, thereby improving efficiency of the whole apparatus 800 and/or magnetic head.

With continued reference to FIG. 8, the sensing structure 814 may be coupled to a second connection pad 818. Moreover, the sensing structure 814 may only have a sensing function in the apparatus 800, e.g., the sensing structure may have no function in the device relating to data transduction (reading and/or writing). Thus, according to some approaches, the sensing structure 814 may include the same or similar construction as other electrically conductive structures as described herein, e.g., the sensing structure 814 may be nonmagnetic.

In a preferred approach, the sensing structure 814 may sense a voltage at the MBS 810, developed during use of the apparatus 800. As a result, the sensing structure 814 may be used to address sensor shorting, wear, electrical discharges, etc., by providing information to be gathered from the apparatus 800. According to one approach, the data acquired from the sensing structure 814 may be used to calculate the desired biasing voltage to be applied to each of the electrically conductive structures 806, e.g., to match and/or counteract voltage buildup thereon during operation.

According to the present embodiment illustrated in FIG. 8, the second connection pad 818 is not in electrical communication with the first electrically conductive bus 804 or the first connection pad 812. As a result, the information gathered by the sensing structure 814 may be used to determine desired biasing voltages of the electrically conductive structures 806, as will soon become apparent. However according in other approaches, the second connection pad 818 may be operatively coupled to the first electrically conductive bus 804 and/or the first connection pad 812, e.g., see biasing circuit 1002 of FIG. 10.

Figure 10:
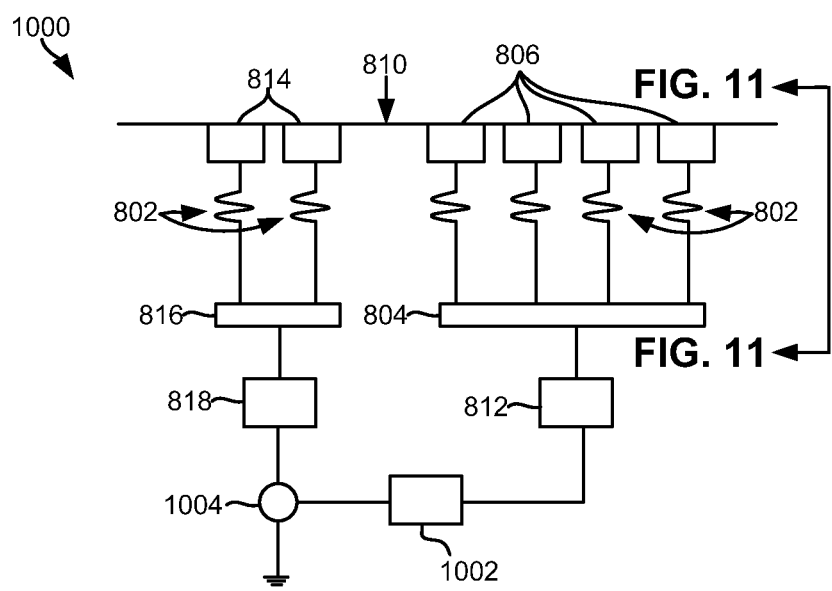
FIG. 10 is a representational diagram according to one embodiment.

FIG. 10 depicts a representative diagram of an apparatus 1000, in accordance with one embodiment. As an option, the present apparatus 1000 may be implemented in conjunction with features from any other embodiment listed herein, such as those described with reference to the other FIGS. Some of the components of FIG. 10 contain similar numbering to those of the apparatus 800 of FIG. 8 in particular, and thus are intended to include the different designs of the components thereof. Of course, however, such apparatus 1000 and others presented herein may be used in various applications and/or in permutations which may or may not be specifically described in the illustrative embodiments listed herein. Further, the apparatus 1000 presented herein may be used in any desired environment.

Referring now to FIG. 10, the apparatus 1000 includes a biasing circuit 1002 coupled to the first and/or second electrically conductive buses 804, 816, respectively. According to a preferred approach, the biasing circuit 1002 may be configured to bias the first electrically conductive bus 804, and thus the electrically conductive structures 806, to a voltage, e.g., a predefined voltage, a voltage selected based on an input from the sensing structure 814, a voltage selected based on a potential of the substrate of the transducers, adaptive voltage based on some other criteria, etc. However, according to different approaches, the apparatus may include more than one biasing structure and/or method of biasing.

As illustrated in FIG. 10, in some approaches, one or more sensing structures 814 are coupled to a second electrically conductive bus 816 and second connection pad 818. It should be noted that the sensing structure 814 is preferably an electrically conductive structure, but is not limited thereto. The sensing structure 814 and second connection pad 818 may be electrically coupled to the biasing circuit 1002. Thus, the desired biasing voltage may be determined based on feedback from the sensing structure 814, where according to various approaches, any known manner of determining the biasing voltage may be used. The data acquired from the sensing structure 814 may be updated periodically, upon a user's request, when a condition is met, by a controller, etc. Upon being updated, the data from the sensing structure 814 may be used to alter the biasing voltage of the electrically conductive structures 806, using any of the approaches described herein. Moreover, the data may be stored, e.g., for future use, in a lookup table, memory located off the magnetic head, etc.

To achieve the predetermined voltage, the biasing circuit 1002 may apply a fixed potential, a variable potential, and/or a combination thereof, e.g., the biasing circuit 1002 may be configured for both. According to various approaches, to bias the electrically conductive structures 806 to the predetermined potential, the biasing circuit 1002 may include AC and/or DC biasing circuitry; pulsing circuitry; potentiostatic circuitry; or tied to another structure, such as the head substrate, closure or other device, e.g., including a resistor, inductor, capacitor, etc., which may be located in the head itself; etc. Moreover, in other approaches, the first and/or second connection pad 812, 818 may be electrically coupled to a source and/or structure having a charge that is at least slightly more negative relative to that of the head substrate. Further still, one or more of the connection pads 812, 818 may be electrically coupled to a floating potential, e.g., a left floating potential. However, according to various approaches, the detailed implementation of a predetermined potential will depend upon the triobological conditions of the apparatus 1000.

Figure 11:
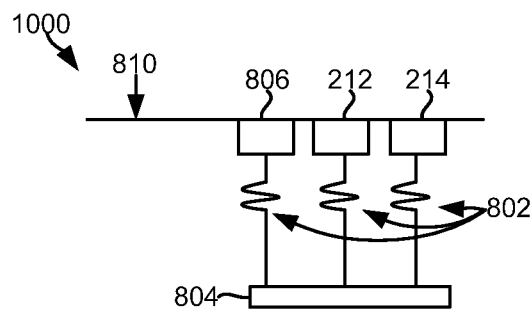
FIG. 11 is a partial side view of the representational diagram in FIG. 10.

In different embodiments, the apparatus 1000 may include a processor, a controller, a computing device, a switch, etc., to select the desired biasing level. In the case of a writer head assembly, connection pad 812 may include a flex circuit, e.g., which may connect the electrically conductive structures 806 to a circuit board having write drivers and/or other electronic components which would be apparent to one skilled in the art upon reading the present description. In a further approach, a flex circuit may have a trace or traces for connecting the bus 804 pad to a circuit board of a type known in the art. Moreover, looking to FIG. 11, resistive links 802 are illustrated as being coupled to electrically conductive bus 804 and electrically conductive structures 806 in addition to transducers 212, 214 as described above.

Depending on the embodiment, the biasing circuit 1002 may have no other function than to bias the electrically conductive bus 804 and/or the electrically conductive structure(s) coupled thereto, but is not limited thereto. Thus, in one approach, the biasing circuit may be a dedicated circuit and/or processor. According to other approaches, the biasing circuit 1002 may be a controller, such as a drive controller; an ASIC; etc. Moreover, the biasing circuit may be connected to the first and/or second electrically conductive bus 804, 816 via a head cable, dedicated cable, etc.

According to one approach, the biasing circuit 1002 may include an ammeter which may derive the voltage of the magnetic head from the amount of current flowing through the biasing circuit 1002. In another approach the biasing circuit 1002 may include a volt meter which may measure the voltage of the magnetic head. However, in yet another approach, as illustrated in FIG. 10, the biasing circuit 1002 may include a multimeter 1004 which may be used to measure the voltage of the magnetic head, and/or derive it from the current flowing therethrough, depending on the desired embodiment.

According to another exemplary embodiment, which is in no way intended to limit the invention, an apparatus may include an array of transducers, in addition to an electrically conductive bus and resistive links, according to any of the approaches described herein (e.g., see FIG. 9A). Thus, according to one approach resistive links may be electrically coupled between the electrically conductive bus and one or more of a plurality of electrically conductive structures, and/or at least some of the array of transducers. According to different approaches, the array of transducers may include one or more writer poles and/or reader shields. Thus, the resistive links may be coupled to at least one of the writer poles and/or reader shields of the array of transducers.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a resistive link coupled to both an electrically conductive bus and an electrically conductive structure, the electrically conductive structure being positioned proximate to a media bearing surface;
   a sensing structure coupled to a connection pad; and
   a biasing circuit coupled to the electrically conductive bus, the biasing circuit being configured to bias the electrically conductive bus to a voltage based on a potential of the sensing structure.

2. An apparatus as recited in claim 1, wherein a plurality of resistive links and electrically conductive structures are present, each of the electrically conductive structures being coupled to the electrically conductive bus by a unique one of the resistive links.

3. An apparatus as recited in claim 1, wherein the electrically conductive structure is at least one of a writer pole and a reader shield.

4. An apparatus as recited in claim 1, wherein the electrically conductive structure has no function in the apparatus relating to data transduction.

5. An apparatus as recited in claim 1, further comprising a connection pad coupled to the electrically conductive bus.

6. An apparatus as recited in claim 1, wherein the sensing structure has only a sensing function in the apparatus.

7. An apparatus as recited in claim 1, further comprising a second biasing circuit coupled to the electrically conductive bus, the second biasing circuit being configured to bias the electrically conductive bus to a voltage.

8. An apparatus as recited in claim 7, wherein the biasing circuit has no other function than to bias the electrically conductive bus.

9. An apparatus as recited in claim 1, further comprising:
   a drive mechanism for passing a magnetic medium over the electrically conductive structure; and
   a controller electrically coupled to the electrically conductive bus.

10. An apparatus, comprising:
    an array of transducers;
    an electrically conductive bus;
    resistive links electrically coupled between the electrically conductive bus and at least one of: each of a plurality of electrically conductive structures, and at least some of the transducers; and
    a biasing circuit coupled to the electrically conductive bus, the biasing circuit being configured to bias the electrically conductive bus to a voltage based on at least one of a potential of a sensing structure having no function relating to data transduction, and a potential of a substrate of the transducers.

11. An apparatus as recited in claim 10, wherein the resistive links are coupled to writer poles of the transducers.

12. An apparatus as recited in claim 10, wherein the resistive links are coupled to reader shields of the transducers.

13. An apparatus as recited in claim 10, wherein the resistive links are coupled to electrically conductive structures having no function in the apparatus relating to data transduction.

14. An apparatus as recited in claim 10, further comprising a sensing structure coupled to a connection pad, wherein the connection pad is not in electrical communication with the electrically conductive bus.

15. An apparatus as recited in claim 10, wherein the biasing circuit has no other function than to bias the electrically conductive bus.

16. An apparatus as recited in claim 10, further comprising:
a drive mechanism for passing a magnetic medium over the electrically conductive structure; and
a controller electrically coupled to the electrically conductive bus.

* * * * *